United States Patent
Kannermark et al.

(10) Patent No.: US 9,319,668 B2
(45) Date of Patent: Apr. 19, 2016

(54) METHOD AND SYSTEM FOR GENERATING REAL-TIME MOTION VIDEO

(71) Applicant: AXIS AB, Lund (SE)

(72) Inventors: Per Kannermark, Malmo (SE); Stefan Lundberg, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 14/092,136

(22) Filed: Nov. 27, 2013

(65) Prior Publication Data

US 2014/0146185 A1    May 29, 2014

(30) Foreign Application Priority Data

Nov. 29, 2012 (EP) .................... 12194819

(51) Int. Cl.
| | |
|---|---|
| *H04N 17/00* | (2006.01) |
| *H04N 17/02* | (2006.01) |
| *H04N 5/232* | (2006.01) |

(52) U.S. Cl.
CPC ......... *H04N 17/002* (2013.01); *H04N 5/23206* (2013.01); *H04N 17/02* (2013.01)

(58) Field of Classification Search
USPC ........................................ 348/187, 135, 143
See application file for complete search history.

(56) References Cited

U.S. PATENT DOCUMENTS

| | | | |
|---|---|---|---|
| 5,839,094 A | 11/1998 | French | |
| 7,126,629 B1 * | 10/2006 | Braunstein | G11B 27/034 348/207.1 |
| 7,502,066 B1 | 3/2009 | Merrill et al. | |
| 7,855,727 B2 | 12/2010 | Adler et al. | |
| 8,049,789 B2 | 11/2011 | Innocent | |
| 8,314,865 B2 * | 11/2012 | Muukki et al. | 348/251 |
| 8,466,974 B2 | 6/2013 | Yu et al. | |
| 8,780,225 B2 | 7/2014 | Bai et al. | |
| 2003/0206231 A1 | 11/2003 | Chen et al. | |
| 2004/0090534 A1 | 5/2004 | Nakami et al. | |
| 2004/0239798 A1 * | 12/2004 | Nayar et al. | 348/362 |
| 2005/0033540 A1 | 2/2005 | Bathurst et al. | |
| 2008/0100704 A1 * | 5/2008 | Venetianer et al. | 348/143 |
| 2009/0169120 A1 | 7/2009 | Otani | |
| 2010/0110209 A1 | 5/2010 | Border et al. | |
| 2010/0118169 A1 | 5/2010 | Yu et al. | |
| 2010/0175074 A1 | 7/2010 | Kanada | |
| 2010/0321506 A1 * | 12/2010 | Li et al. | 348/187 |
| 2011/0149116 A1 * | 6/2011 | Kim | 348/231.99 |
| 2011/0187859 A1 * | 8/2011 | Edelson | 348/143 |

(Continued)

FOREIGN PATENT DOCUMENTS

| | | |
|---|---|---|
| EP | 1048933 A1 | 11/2000 |
| JP | 2004193683 A | 7/2004 |
| WO | 03001331 A2 | 1/2003 |

*Primary Examiner* — Brian Yenke (74) *Attorney, Agent, or Firm* — Volpe and Koenig, P.C.

(57) ABSTRACT

The present invention relates to a method for generating real-time motion video. The method comprises receiving, at a video processing device, calibration data from a memory in an image sensor unit, the calibration data relating to properties of the image sensor unit. The video processing device receiving real-time raw image data from the image sensor unit via a communication cable and a communication protocol. The video processing device processing the real-time raw image data received from the image sensor unit, where the processing includes adjusting received image data based on at least part of the received calibration data and encoding the image data to a predetermined video format, and outputting the processed image data in real time.

30 Claims, 4 Drawing Sheets

(56) References Cited

U.S. PATENT DOCUMENTS

| | | | |
|---|---|---|---|
| 2011/0302347 A1 | 12/2011 | Schubert et al. | |
| 2012/0081519 A1* | 4/2012 | Goma | H04N 5/247 348/47 |
| 2012/0081566 A1* | 4/2012 | Cote | H04N 5/2354 348/222.1 |
| 2012/0105374 A1* | 5/2012 | Chen et al. | 345/175 |
| 2012/0273910 A1* | 11/2012 | Hochschulz et al. | 257/432 |
| 2012/0274786 A1* | 11/2012 | Wang | 348/187 |
| 2013/0012263 A1 | 1/2013 | Goto et al. | |
| 2013/0182177 A1* | 7/2013 | Furlan | 348/362 |
| 2013/0182756 A1* | 7/2013 | Furlan | 375/240.02 |
| 2014/0036072 A1* | 2/2014 | Lyall et al. | 348/143 |

* cited by examiner

METHOD AND SYSTEM FOR GENERATING REAL-TIME MOTION VIDEO

INCORPORATION BY REFERENCE

This application claims the benefit of U.S. Provisional Patent Application No. 61/732,075, filed Nov. 30, 2012 and European Patent Application No. 12194819.4 filed Nov. 29, 2012, which are incorporated herein by reference as if fully set forth.

FIELD OF INVENTION

The present invention relates to a method and a camera system for generating real-time motion video. In particular the invention relates to monitoring systems and surveillance system registering real-time motion video.

BACKGROUND

There are monitoring or surveillance installations that require small cameras or image capturing devices because of restrictions in installation space or in order to enable the cameras or image capturing devices to be disguised. One example of such installations is installations at ATMs (Automated Teller Machines), where at least one of the cameras generally is invisible or almost invisible. Another example of such installations is installations in public transportation or any vehicle where there is limited space or room for large surveillance cameras. There are a lot more places, applications, or installations that either require the use of or advantageously use small cameras.

Some of the installations are in devices, machines, or vehicles that often are manufactured at an industrial scale and often at an assembly line. In these types of manufacturing processes time is of great importance and therefor it is important to keep the installation time and set up time short.

Moreover, many of the small cameras used today are analogue cameras. However, the surveillance technology is marching towards digital management of surveillance imagery and surveillance control parameters.

SUMMARY

One object of the present invention is to provide an improved camera system using small image capturing devices.

In particular, according to one embodiment of the invention, the method for generating real-time motion video comprises receiving, at a video processing device, calibration data from a memory in an image sensor unit, said calibration data relating to properties of the image sensor unit, receiving, at the video processing device, real-time raw image data from the image sensor unit via a communication cable and a communication protocol, processing, in the video processing device, the real-time raw image data received from the image sensor unit, said processing includes adjusting received image data based on at least part of the received calibration data and encoding the image data to a predetermined video format, and outputting the processed image data in real time.

One advantage of having calibration data stored in the image sensor unit itself and of having the calibration data accessed from outside the image sensor unit is that installation of the imaging system becomes easier because the calibration data is strongly related to the specific image sensor unit which is the subject of the calibration data. Moreover the calibration data may be unique for each image sensor device without the implementation of large and complicated managing systems for the calibration data. Further, as a result of individual calibration data being easily managed it becomes easy to optimize the performance of image sensor units based on data retrieved during individual tests and based on type specific calibration data.

Another advantage with the above method is that the image sensor device may be a small device including relatively few components and thereby the image sensor may be mounted in small spaces. As the image sensor unit may include very few components due to the arrangement of the major image processing in a device separate from the image sensor unit the temperature of the image sensor unit may be kept low as it includes fewer heat generating components and it does not host the most power intensive processing of the video.

In another embodiment, a method further comprises applying a demosaicing algorithm to the received image data. Performing demosaicing in the processing unit results in that the most power intensive processing of the video is performed in the video processing device and not in the image sensor unit. Hence, the temperature of the image sensor unit may be kept relatively low. Moreover, this also makes it possible to make the image sensor unit small because less processing electronics will be needed in the image sensor unit as it is located in the video processing device.

In another embodiment, the method further comprises converting the image data to a predetermined colour space. This is also advantageous in that more processing is performed in the video processing device and less is performed in the image sensor unit.

In yet another embodiment, the encoding of image data includes compressing the image data using lossy compression.

According to another embodiment, the method further comprises the act of retrieving from a memory in the image sensor unit said calibration data and sending the calibration data from the sensor unit to the video processing device. Thereby the calibration data is easily distributed and managed. Moreover the risk of erroneous calibration data being used becomes smaller.

In an embodiment, the calibration data includes colour correction data.

In another embodiment, the calibration data includes image noise reduction data.

According to another embodiment, the calibration data relates to characteristics of the image sensor.

In yet another embodiment, the real time raw image data received at the processing device is digital data.

According to another embodiment, the method further comprises receiving, at the video processing device, calibration data from a second image sensor unit, said calibration data from the second image sensor unit relates to properties of the second image sensor unit, receiving, at the video processing device, real-time raw image data from the second image sensor unit via a communication cable and a communication protocol, processing, in the video processing device, the real-time raw image data received from the second image sensor unit, said processing includes adjusting received image data based on at least part of the calibration data received from the second image sensor unit and encoding the image data to a predetermined video format, and outputting the processed image data originating from the second image sensor unit in real time.

One advantage of connecting a plurality of image sensor units to a single video processing unit and having a plurality of them send the real-time raw image data to a common video processing unit is that hardware may be shared and be more efficiently used. Moreover, by having each of the image sensor units carrying its own calibration data the managing of the image sensor unit's calibration data will be extremely simple, as the video processing device may easily determine which calibration data belongs to which image sensor unit without the need of any other external intervention or information. Further, if the calibration data includes position or task information indicating the intended use of the camera in the installation and this calibration data is stored in the image sensor unit specific processing of the images in view of the camera position or the task of the camera may be applied easily. Hence, the installation of such systems is facilitated.

In another embodiment, the calibration data is sent once at initiation of the image sensor unit.

In another embodiment, the calibration data is sent upon request from the processing device.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of a presently preferred embodiment, with reference to the accompanying drawings, in which.

Further, in the figures like reference characters designate like or corresponding parts throughout the several figures.

DETAILED DESCRIPTION OF THE PREFERRED EMBODIMENTS

Figure 1:
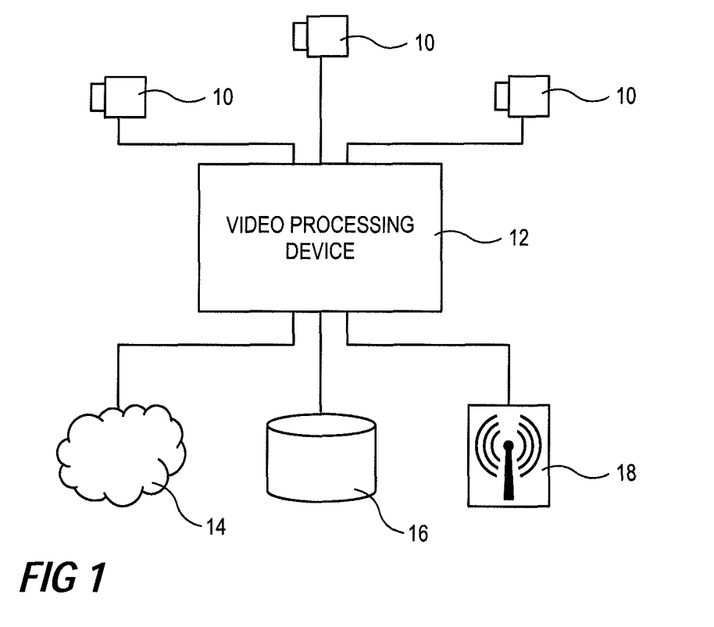
FIG. 1 is a block diagram of a system for generating real-time motion video according to one embodiment of the invention.

The present invention relates to a monitoring system capturing motion video images. According to an embodiment, see FIG. 1, the system includes a plurality of small image sensor units 10, which may be simple motion video registration devices or simple cameras, a video processing device 12, and motion video delivery channel 14, 16, 18. The image sensor unit 10 may also be called a "thin camera", referring to thin client concepts in that the small camera may be seen as a motion video capturing device which depends heavily on another more powerful device, e.g. a video processing unit 12, to fulfil its traditional motion video capturing role. This stands in contrast to a traditional motion video camera in which the camera performs all processing up to outputting a completely viewable and shareable motion video. The motion video delivery channel may be any one of, or any combination of, a computer network 14, e.g. a wide area network (WAN), a local area network (LAN), the Internet, etc., a storage device 16, e.g. a storage server, a data base, an external hard drive, etc., and a radio connection 18, e.g. a wireless LAN, mobile phone network, etc.

Figure 2:
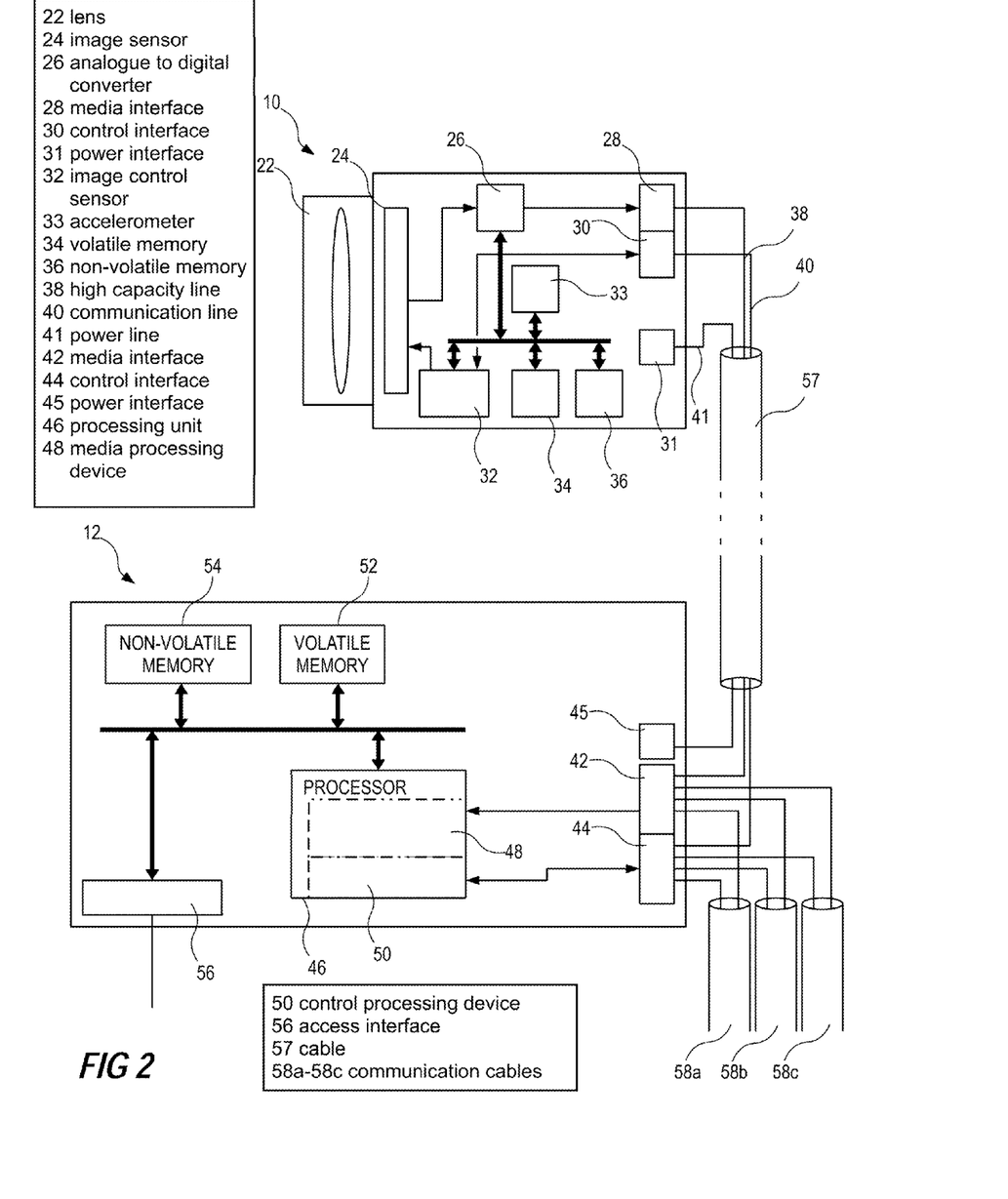
FIG. 2 is a block diagram of an image sensor unit and a video processing unit according to one embodiment of the invention.

Now referring to FIG. 2, an image sensor unit 10 includes a lens 22, an image sensor 24, an analogue to digital converter 26 (ADC), which may be built into the image sensor 24, a media interface 28, a control interface 30, a power interface 31, an image sensor controller 32, an accelerometer 33, a volatile memory 34, and a non-volatile memory 36. The lens 22 may be any optical lens suitable for capturing light of a scene intended to be captured and focus said light from the scene onto the image sensor 24. The image sensor 24 may be any type of image sensor, e.g. a Complementary metal-oxide-semiconductor (CMOS) or a charge-coupled device (CCD). Information generated from the light arriving at the image sensor 24 is processed by the ADC 26 in order to convert the analogue electrical levels indicating the amount of light captured at each pixel of the image sensor 24 into digital image information. The digital image information from the ADC 26 is raw image data, i.e. none of the digitized pixels in the raw image data has been changed based on data from neighbouring pixels.

The media interface 28 is connecting the raw video data or a stream of raw video data to the video processing device. The raw image data is not compressed and therefore a high capacity transfer method and high capacity lines 38, or cable is required in order to transfer the raw video data to the video processing device 12. Moreover, in applications requiring high frame rate video, the transfer method and the transfer lines has to allow high speed transfer of the raw video data. The media interface 28 includes all communication protocols and hardware necessary for sending the raw video data over the high capacity lines 38. A simplex communication scheme, i.e. communication in one direction only, may be implemented for the media interface.

The control interface 30 is connecting the image sensor controller 32 to the processing device 12 in order to enable exchange of control information, control instructions, status information, calibration data relating to properties of the image sensor unit, driver data, etc., additional example will be presented below. The data sent via this interface is typically data not requiring high bandwidth, i.e. the data messages are small in relation to video data and are not sent at the same high pace as the data over the media interface 28. Therefore the communication from the control interface 30 to the video processing device 12 via the communication line or lines 40 do not require a high capacity cable or high capacity lines. The control information sent and received via the control interface 30 may be managed by the image sensor controller 32. In one embodiment a separate processing unit, not shown, is arranged to handle transmission of control information stored in the image sensor unit 10 to avoid loading the image sensor controller 32.

The line/lines 40 used for communication between the control interface 30 of the image sensor unit 10 and a control interface 44 of the video processing unit 12 may be separate line/lines 40 from the line/lines 38 used for data transfer via the media interface 28 or the same lines may be used for both interfaces. Power for powering the image sensor unit 10 may be distributed via a separate power line 41 in the same cable 57 as the communication lines or the data and power may be transferred via a common line.

In the image sensor unit 10 the power interface 31 is arranged to receive the power received via a power carrying line 41 and to distribute the power within the image sensor unit 10.

The image sensor controller 32 is arranged to control the timing of the image sensor, i.e. providing timing for reset signals, timing for readout signals, etc. In one embodiment this controller also is arranged to handle control information that is to be sent via the control interface 30. The image sensor controller may also provide clocking signals, register control, power control, control of focus, control of iris, i.e. aperture, control of pan or tilt if any or both are available. Information that is to be sent via the control interface 30 to the processing device 12 is retrieved from either the volatile memory 34 or the non-volatile memory 36. The volatile memory 34 may be used as a temporary storage for data and variables and may also be used as temporary storage for software programs running in the image sensor unit 10. The memory type used as a volatile memory may for example be any Random Access Memory (RAM, dynamic RAM (DRAM), synchronous dynamic random access memory (SDRAM), double data rate (DDR), static RAM (SRAM), etc.). The non-volatile memory 36 may include program code for implementing functions of the image sensor unit 10. Moreover, the non-volatile memory may also store data to be sent out via the control interface 30 and in particular store the kind of data that either is determined and set during testing or manufacturing or that relates to non-temporary settings made by the user/installer in the field, during installation or for adjusting the system or unit. Memory types that may be used as non-volatile memories are for example read only memory (ROM), programmable ROM (PROM), erasable PROM (EPROM), electrically EPROM (EEPROM), non-volatile RAM (NVRAM), Flash memory, and the like.

The accelerometer 33 may be any known type or brand of accelerometer. The accelerometer 33 is a device that measures acceleration. The acceleration measured is called proper acceleration, which is not simply the rate of change of velocity. For example, an accelerometer 33 resting on a surface will measure an acceleration of approximately 9.81 m/s$^2$ straight upwards. In one embodiment the accelerometer 33 is an accelerometer measuring in at least three dimensions. The accelerometer 33 is connected to the image sensor controller 32 and the image sensor unit 10 is arranged to provide the video processing unit 12 with the data from the accelerometer 33. The data from the accelerometer 33 may be sent via the control interface 30. This data may be used to detect if and by how much the image sensor unit 10 is vibrating. Hence, an image stabilisation process may be implemented in the video processing unit 12 compensating for vibration and thereby generating a stable video image.

The video processing unit 12 is a separate device that is to be arranged at a distance from the image sensor unit 10 in order to enable installation of video capturing devices in small spaces or to make the installation substantially invisible by enable parts of the hardware for video generation to be arranged at a different position or location than the image sensor unit 10. The video processing unit 12 includes a media interface 42, the control interface 44, the power interface 45, and a processing unit 46, which in turn includes a media processing device 48 and a control processing device 50. Moreover, the video processing unit 12 includes a volatile memory 52, a non-volatile memory 54, and an access interface 56.

The media interface 42 is arranged to receive the raw video data or streaming raw video data from the image sensor unit 10 via the high capacity lines 38, acting as a media transport channel. The media interface 42 is also arranged to receive corresponding raw video data or streaming raw video data from additional image sensor units 10 that each are connected to the media interface 42 via communication cable 58a-c, respectively. Protocol or protocols for processing the signal or signals carrying the raw video data may be implemented in the media interface 42 or as program code stored in non-volatile memory 54 and processed by the processing unit 46.

The control interface 44 is arranged to exchange control information, control instructions, status information, calibration data relating to properties of the image sensor unit, driver data, etc., and additional examples will be presented below, with the image sensor unit 10 via communication line 40. The control interface 44 is also arranged to receive corresponding data or information from additional image sensor units 10 via respective communication cable 58a-c. Protocol or protocols for processing the signal or signals carrying data to the control interface 44 and for generating signals including the data to be sent to the image sensor unit 10 may be implemented in the control interface 44 or as program code that is stored in non-volatile memory 54 and that is processed by the processing unit 46.

The processing unit 46 is arranged to process the information or data received at the media interface 42 and the control interface 44 and to generate data to be sent via the control interface 44. According to one embodiment the raw video data is processed by the media processing device 48, being a process of the processing unit 46. In such an embodiment the process of the media processing device is performed by execution in the processing unit 46 of program code stored in the non-volatile memory 54. Alternatively, the media processing device may be implemented by hardware using logical gates, an FPGA (Field-Programmable Gate Array), an ASIC (Application Specific Integrated Circuit), etc.

Processing of the raw video data in the media processing device 48 may include any combination of the functions or processes described below. One of the functions implemented in the media processing device may be a demosaicing algorithm generating practically usable video data from the raw video data. The type of demosaicing algorithm used may depend on the type of sensor, the type of colour filter array (CFA), or the combination of these. One example of a CFA is a Bayer filter which includes red, green, and blue filters arranged in a specific pattern called Bayer pattern. If a video based image sensor is used, a CFA using cyan, magenta, yellow, and green are likely to be used. These two different CFAs will evidently require different algorithms. Other functions that may be implemented in the media processing device are functions for auto exposure, functions for auto focus, functions for automatic aperture settings, functions for applying white balance settings, functions for mapping the raw video data to a specific colour space or colour model, e.g. YUV, YIQ, YDbDr, YPbPr, YCbCr, xvYCC, etc., functions for noise reduction, e.g. a noise reducing algorithm, an algorithm using a fixed noise pattern. Some of these functions may generate signals to be sent to the image sensor unit 10 for controlling features or parameters of the image sensor unit 10. Moreover, video standard schemes such as National Television System Committee (NTSC), Phase Alternating Line (PAL) or SECAM video standards may be applied to the video in the form of deinterlacing, video-aware-filtering, upscaling, frame rate conversion, superresolution, etc. Further processes that may be implemented in the media processing device 48 are encoding schemes such as Moving Picture Experts Group (MPEG), Motion Joint Photographic Experts Group (JPEG), H.264, Advanced Video Coding (AVC), High Efficiency Video Coding (HEVC), H.265, VP8, WebM, WebP, etc.

The control processing device 50 may be arranged to generate and send control information to the image sensor unit 10 and it may be arranged to receive data received via the control interface 40 and process the received information. Control information that could be sent to the image sensor unit 10 may be values relating to the timing of the image sensor 24, e.g. exposure time, may be a setting of read out mode, e.g. how the read out should be performed, may be settings relating to binning control, may be settings relating to read out interface control, e.g. which pins the output will be presented on, may be values relating to a read out window, i.e. which part of the sensor to read out X,Y,W,H, may be related to gain, or may be relating to sensor specific parameters like pixel biasing, read out circuit biasing, power optimization settings, value related to hidden pixels (black pixels), registers related to the pixel sampling (correlated double sampling), values relating to the frame rate, values relating to focus if the image sensor unit or lens may be remotely focused, values relating to the size of the aperture of the image sensor unit 10 or lens may be remotely altered. Further, other possible control information may be values for controlling pan, tilt, zoom, rotation, or any combination thereof. When it comes to data received from the image senor unit 10 there are different types and aspects of such data and these will be presented below.

The volatile memory 52 may be used as a temporary storage for data and variables and may also be used as temporary storage for software programs running in the image sensor unit 10. The memory type used as a volatile memory may for example be any Random Access Memory (RAM, DRAM, DSRAM, DDR, SRAM, etc.). The non-volatile memory 54 may include program code for implementing functions of the video processing unit 12. Moreover, the non-volatile memory may also store pre-sets and data defined for the entire camera system. Memory types that may be used as non-volatile memory 54 are for example ROM, PROM, EPROM, EEPROM, NVRAM, Flash memory, etc.

The access interface 56 is an interface connecting the video processing device 12 to other supporting devices, e.g. storage devices, computers, modems for communications, etc. The access interface may be a single direct link to any such device, e.g. Universal Serial Bus (USB), FireWire, RS-232, etc., or it may be a network interface, e.g. Ethernet, token ring, etc., making it possible to connect to the video processing unit 12 using a device having a network connection. The access interface may also include protocols for communication, e.g. Transmission Control Protocol (TCP), Internet Protocol (IP), User Datagram Protocol (UDP), etc.

According to an embodiment, the video processing unit 12 also provides event management and intelligent video functionalities such as video motion detection, audio detection, active tampering alarm, auto tracking, etc. These functions may be implemented as software code which is executed by the processor 46 in the video processing unit 12. The video processing unit 12 may also offer input/output (I/O) ports that enable connections to external devices such as sensors and relays. Other features that may be implemented is audio capabilities, e.g. audio output, audio input, and audio analysis, built-in support for Power over Ethernet (PoE), meta data generation from detected data and from analysis. The video processing unit 12 may also support advanced security and network management features.

The information stored in the non-volatile memory 36 of the image sensor unit 10 for sending to the video processing unit 12 may be calibration data relating to properties of the image sensor unit 10. Calibration data relating to properties of the image sensor unit may be individual test based adjustment data generated from a testing process performed on an individual image sensor unit 10 or it may be type specific settings or adjustment data generated from said testing or resulting from the design process.

One advantage of storing individual test based adjustment data in the image sensor unit 10 is that the correct and probably optimal adjustment data relating to the particular image sensor unit 10 may be provided to the system at no extra effort from a person installing the system. Another advantage with storing the test based adjustment data in the same image sensor unit 10 as the test based adjustment data is generated from is that the test based adjustment data from a plurality of devices has to be managed centrally and that no search for the data is necessary. Hence, both manufacturing and installation is greatly facilitated. Individual test based adjustment data may for example be a fixed pattern noise, lens corrections, defective pixels, pixel gain, pixel offset errors, pixel rows that are broken, e.g. does not deliver pixel values, gain error per row, etc.

Other sorts of individual data being unique for the image sensor unit 10 and that may be stored therein are a unique identifier, a cryptographic key, a public key, etc. These types of individual data may be used to authenticate the image sensor unit 10 and to guarantee that the correct image sensor unit 10 is used. The cryptographic keys may also be used to encrypt the communication. Another use for the cryptographic keys is to watermark or sign video or images at the image sensor unit 10.

One advantage of storing type specific settings or adjustment data in the image sensor unit 10 is that the installation process may be performed easily even without any access to external data bases or servers where this type of data also could be stored. The feature has an even greater advantage in relation to systems where the person installing have to download such setting or adjustment data to a computer or a removable media in order to introduce the data to a video processing unit 12. Type specific settings or adjustment data may for instance be drivers that the video processing device may use in order to perform more elaborate control on the image sensor unit 10 than the most basic controls which probably is the same independent on the type of image sensor unit 10. Other device specific setting or adjustment data may be information relating to power up sequence, the image sensor unit's 10 supported current and voltage, information about light sources of the image sensor unit 10, e.g. does it have infrared (IR) light, White light emitting diode (LED) light, how much power is required by the lights etc.

Yet another type of data that may be stored in the image sensor unit 10 in order to be passed over to the video processing unit 12 for facilitating installation and/or operation. This data may be stored in the image sensor unit 10 during a system design process or as part of the manufacturing process and may include information relating to the position of the image sensor unit 10 within the application. For example, consider a system to be mounted in a bus, the data in one of the image sensor units 10 may then indicate that it shall be mounted at the back of a bus and the data in another one of the image sensor units 10 may indicate that it shall be mounted in the front of the bus. Other types of information that advantageously may be prestored in the image sensor unit 10 are lens properties, lens profiles, focusing distance, aperture settings in case of fixed aperture, mounted filters, image sensor unit maintenance information, etc. Image sensor unit maintenance information may for instance be information such as for how long time the lights has been active, this may be set for individual lights or as a total value for all lights, for how long time or how many times a focus motor or a zoom motor has been active.

Figure 3:
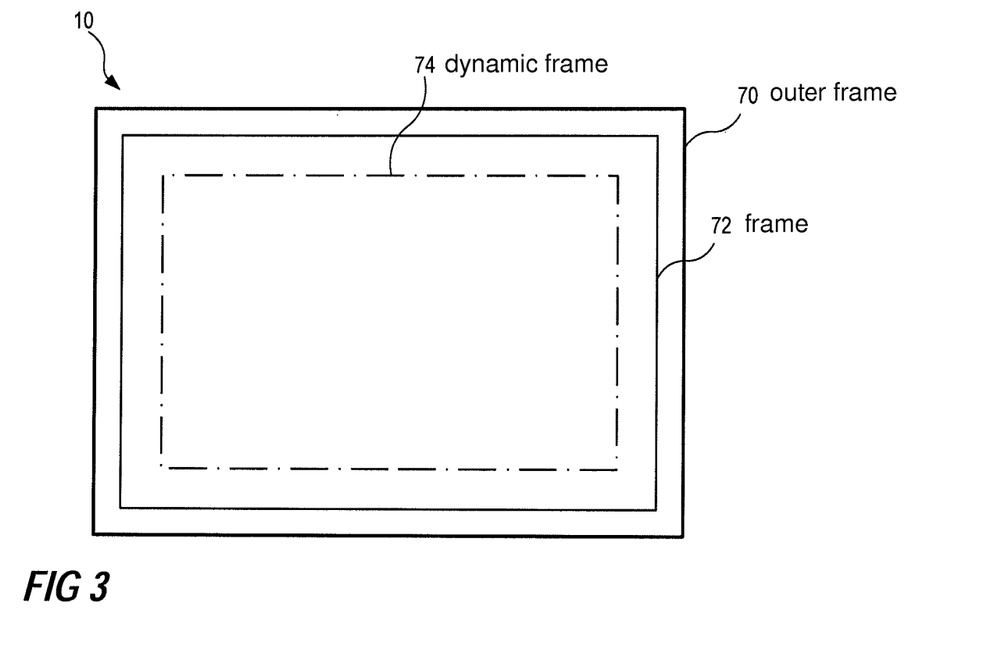
FIG. 3 is a schematic view of image sensor surface.
Figure 4:
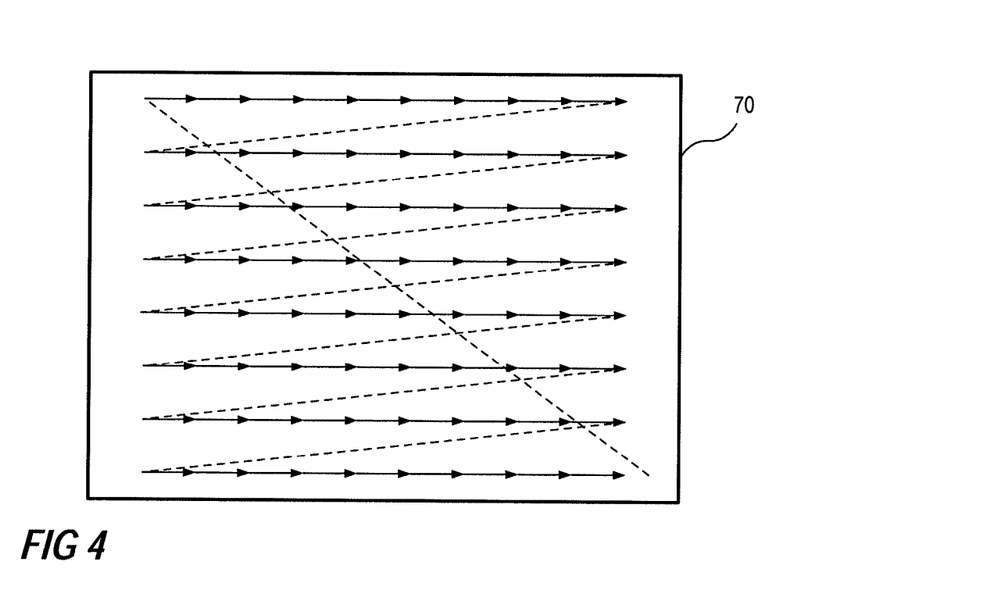
FIG. 4 is a schematic view of a readout from an image sensor.

In one embodiment of the present invention the pixels of the image sensor may be grouped as depicted in FIG. 3. The outer frame 70 indicates the total light sensitive area of the image sensor 24. An area including all the image capturing pixels of the image sensor is indicated by frame 72. An inner frame 74 indicates an image area that may be dynamically repositioned and or resized within frame 72. The image sensor unit 10 is arranged to read out the pixels of the total light sensitive area, frame 70, from the image sensor 24. The reading out of all the pixels within frame 70 is depicted in FIG. 4. FIG. 4 shows a schematic image of a read out process and is therefore not showing all the pixels of an image sensor. The FIG. 4 also depicts that the pixels are read out from the image sensor in a progressive bit-serial process scanning pixels from left to right and one row at a time from the top to the bottom. When the last row, at the bottom of the light sensitive area, has been read out, the process once more starts at the left most pixel of the first row reading out pixels. The pixels are then converted from analogue to digital and is sent to the video processing unit 12 in a bit-serial fashion, i.e. one pixel after another.

The pixels are then processed in the video processing unit 12, wherein the pixels from the area between frame 72 and frame 70 are processed as dummy or black pixels, which do not carry any image information but which may be replaced with other types of data in some embodiments. The area within frame 72 includes pixels that carry image data relating to the scene and which pixels are being processed in the video processing unit 12. Within the area of image data carrying pixels, frame 72, said dynamic area is defined by dynamic frame 74. The dynamic frame is used in order to implement Electronic Image Stabilization (EIS). In an EIS implementation, the pixels of the dynamic area is carrying the image data that will be delivered as an image from the video processing unit. The dynamic frame 74 may then be repositioned and/or resized in order to depress visual effects from vibrations or other shakings of the camera, i.e. a movement of the camera view within the scene is compensated with an opposed movement of the dynamic frame 74 within the pixels carrying image data.

According to one aspect of the invention, a process of generating real-time motion video is performed in the system. In one embodiment the process is implemented by means of a system including any one of the image sensor units 10 and the video processing units 12 described above.

Figure 5:
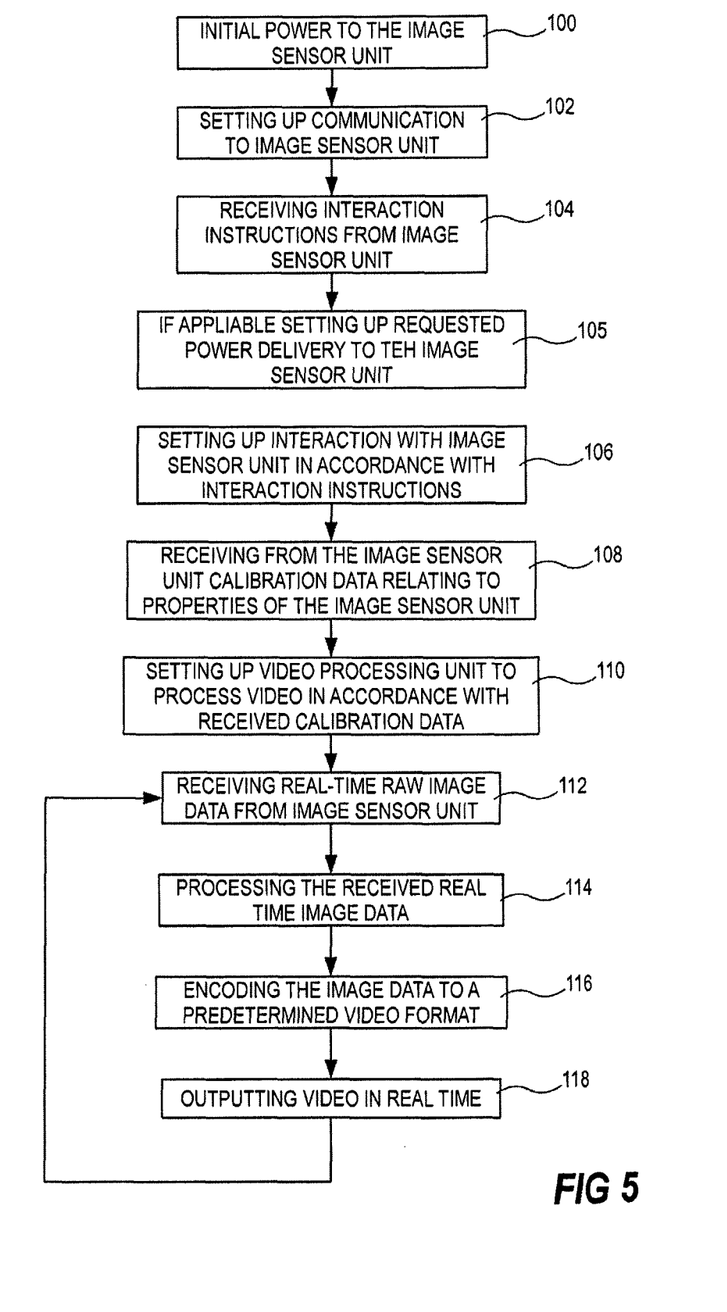
FIG. 5 is a flowchart of a method for generating real-time motion video according to one embodiment of the invention.

Referring now to FIG. 5, the process for generating real-time motion video starts with the act of providing initial power to the image sensor unit (100), and with the act of setting up initial communication between the image sensor unit 10 and the video processing unit 12 (102). The initial power provided to the image sensor unit 10 in 100 may be provided from the video processing unit 12 and may be a low voltage power that may be sufficient for any compatible type of image sensor unit 10 to start basic communications functionality. The initial basic communications may be initiated by the image sensor unit 10 or the video processing device 12. In one embodiment, the communication is initiated in response to the image sensor unit 10 being plugged in to the video processing unit 12. According to a further embodiment, the video processing device 12 detects if an image sensor unit 10 is connected to the video processing device 12 and then initiates this process, starting at 100. In the following description of the process, the process will be described from the perspective of the video processing unit 12. Interaction instructions are then received from the image sensor unit 10 (104). The interaction instructions are interpreted by the video processing unit 12 and the video processing unit is set up accordingly for full functionality interaction with the image sensor unit (106). The interaction instructions may also include information relating to power requirement and an indication of a required voltage level to fully power up the image sensor unit 10.

If the interaction instructions include information of power requirement other than the initially provided power, then the video processing unit 12 starts to deliver the requested power with the requested characteristics (105).

When the communication between the image sensor unit 10 and the video processing unit 12 is set up, at least to such a level that communication over the control interfaces are possible, then image sensor unit calibration data relating to properties of the image sensor unit 10 is sent from the image sensor unit 10 and received at the video processing unit 12 (108). Then based on the calibration data received from the image sensor unit 10 the video processing of the video processing device is set up (110). When, the video processing device is setup for processing the video data received from the image sensor unit 10 the real-time raw image data from the image sensor unit 10 is received at the video processing unit 12 (112). The real-time raw image data is transferred via the media interfaces 28 and 42 and the communication line 38 or cable there between. The real-time raw image data is digital data. The received real-time raw image data is then processed based on the calibration data received from the image sensor unit 10 (114). The processing of real-time raw image data may include any combination of the functions or processes described in this specification. One of the functions implemented in the media processing device may be a demosaicing algorithm generating practically usable video data from the real-time raw video data. A Bayer filter is an example of such a demosaicing algorithm. Other functions that may be implemented in the media processing device are a function for applying white balance settings, a function for mapping the raw video data to a specific colour space or colour model, e.g. YUV, YIQ, YDbDr, YPbPr, YCbCr, xvYCC, etc., a function for noise reduction, e.g. a spatial or temporal noise reducing algorithm, an algorithm using a fixed noise pattern, functions for correcting defective pixels. The fixed pattern data and the defective pixels data may advantageously be received from the image sensor unit 10. Further, pixel gain, offset errors, colour filter features, etc. may advantageously be stored in and then received from the image sensor unit 10. Moreover, video standard schemes such as NTSC, PAL or SECAM video standards may be applied to the video.

Then the processed image data is encoded and compressed (116), by means of a predetermined encoding process. The encoding process used may include a process applying lossy compression to the motion video. Encoders used may for instance be encoders for MPEG, Motion JPEG, H.264, AVC, HEVC, H.265, VP8, WebM, WebP, etc. The motion video is then outputted in real time, step 118, to the network, to a storage device, to a radio transmitter, to a client device, to a motion video server, etc.

According to a further embodiment the video processing unit 12 may be arranged to analyse the power requirement of an image sensor unit 10 and evaluate whether the video processing unit have capacity to power the image sensor unit 10.

If it concludes that it does not have the capacity it may signal this fact to a user via indicators on the video processing device 12 or via a network connection to a client.

Calibration data may be stored in the image sensor unit 10 during a testing or calibration process. Such testing or calibration process may be performed at the time of manufacturing of the image sensor unit 10 or at least at some point in time before is shipped for installation. The testing or calibration process may also be repeated at a later stage, e.g. when the image sensor has been in use for a while, in a re-calibration process.

In systems where additional image sensor units 10 are connected to the video processing unit 12 the additional image sensor units 10 may also operate in accordance with the flowchart of FIG. 5. In order to share the processing power of the video processing unit 12 the real-time raw image data from the different image sensor units 10 may be processed in separate time slots. This may be achieved by means of buffers on the input from each image sensor unit 10 buffering the received image data until the appropriate time slot arrives.

According to another embodiment of the invention the image sensor 24 in the image sensing unit is a sensor detecting Infra-Red (IR) radiation. The detector may for instance be a detector based on microbolometer technology. Further, the IR sensor may be arranged to detect LWIR radiation (Long Wave Infra-Red).

The raw IR detection data received at the video processing unit is not processed using a demosaicing algorithm, but rather using a Non-Uniformity Correction (NUC) scheme. In the NUC scheme the raw IR detection data may be combined with temperature data, e.g. the temperature at the IR sensor.

What is claimed is:

1. A method for generating real-time motion video, the method comprising:
   receiving, at a control interface of a video processing device, calibration data and authentication data from a memory in an image sensor unit, the calibration data relating to properties of the image sensor unit, wherein the video processing device and the image sensor unit are separate, non-integrated devices,
   receiving, at a media interface of the video processing device, real-time raw image data from the image sensor of the image sensor unit via a communication cable and a communication protocol, said real-time raw image data is digitized pixels from the image sensor and wherein none of the digitized pixels has been changed based on data in a neighbouring pixel,
   processing, in a media processing device of the video processing device, the real-time raw image data received from the image sensor of the image sensor unit in view of the calibration data and authentication data received at a control processing device from the control interface, wherein the processing includes applying a de-mosaicing algorithm to received image data, adjusting received image data based on at least part of the received calibration data and encoding the image data to a predetermined video format, and
   outputting the processed image data in real time.

2. The method according to claim 1, wherein the processing further comprises converting the image data to a predetermined colour space.

3. The method according to claim 1, wherein the encoding of image data includes compressing the image data using lossy compression.

4. The method according to claim 1, further comprising:
   retrieving from a memory in the image sensor unit the calibration data; and,
   sending the calibration data from the image sensor unit to the video processing device.

5. The method according to claim 1, wherein the calibration data includes colour correction data.

6. The method according to claim 1, wherein the calibration data includes image noise reduction data.

7. The method according to claim 1, wherein the calibration data relates to characteristics of the image sensor.

8. The method according to claim 1, wherein said real time raw image data received at the video processing device is digital data.

9. The method according claim 1, further comprising:
   receiving, at the control interface of the video processing device, calibration data from a second image sensor unit, the calibration data from the second image sensor unit relates to properties of the second image sensor unit,
   receiving, at the media interface of the video processing device, real-time raw image data from the second image sensor unit via a communication cable and a communication protocol,
   processing, in the media processing device of the video processing device, the real-time raw image data received from the second image sensor unit, wherein the processing includes adjusting received image data based on at least part of the calibration data received from the second image sensor unit and encoding the image data to a predetermined video format, and
   outputting the processed image data originating from the second image sensor unit in real time.

10. The method according to claim 1, wherein said calibration data is sent once at initiation of the image sensor unit.

11. The method according to claim 1, wherein said calibration data is sent upon request from the processing device.

12. The method according to claim 1, further comprising:
    exchanging power requirement information between the video processing device and the image sensor unit to fully power up the image sensor unit.

13. The method according to claim 12, wherein the video processing device notifies a user that capacity is unavailable to power the image sensor unit.

14. The method according to claim 1, wherein the calibration data includes image sensor unit position and task information with respect to the image sensor unit.

15. The method according to claim 14, further comprising:
    installing the image sensor unit based on the image sensor unit position and task information.

16. The method of claim 1, further comprising:
    receiving, at a control interface of the image sensor unit, timing information for the image sensor, read out mode, interface control, power optimization and pan, tilt, zoom parameters;
    receiving, at a power interface of the image sensor unit, power from the video processing unit via a power line;
    capturing, at the image sensor, the real-time raw image data using the timing information for the image sensor, the read out mode, the interface control, the power optimization and the pan, tilt, zoom parameters received by the image sensor controller from the control interface of the image sensor unit;
    measuring, with an accelerometer, acceleration data;
    digitizing, at the analog-to-digital converter, the real-time raw image data;
    transmitting, via a media interface of the image sensor unit, the real-time raw image data to the media interface of the video processing device; and
    transmitting, via the control interface of the image sensor unit, control information, control instructions, calibration data, acceleration data and authentication data to the control interface of the video processing device.

17. A device for generating real-time motion video, comprising:
a control interface of a video processing device configured to receive control information, calibration data and authentication data from a memory in an image sensor unit, the calibration data relating to properties of the image sensor unit, wherein the video processing device and the image sensor unit are separate, non-integrated devices;
a media interface of the video processing device configured to receive real-time raw image data from the image sensor the image sensor unit via a communication cable and a communication protocol;
the media processing device of the video processing device configured to process the real-time raw image data received from the image sensor unit in association with the control information, calibration data and authentication data received at a control processing device from the control interface, wherein the processing includes applying a de-mosaicing algorithm to received image data, adjusting received image data based on at least part of the received calibration data and encoding the image data to a predetermined video format, wherein the image sensor unit lacks a media processing device for processing the real-time raw image data; and
the video processing device configured to output the processed image data in real time.

18. The device according to claim 17, wherein the processing further comprises converting the image data to a predetermined colour space.

19. The device according to claim 17, wherein the encoding of image data includes compressing the image data using lossy compression.

20. The device according to claim 17, wherein the calibration data includes colour correction data.

21. The device according to claim 17, wherein the calibration data includes image noise reduction data.

22. The device according to claim 17, wherein the calibration data relates to characteristics of the image sensor.

23. The device according to claim 17, wherein the real time raw image data is digital data.

24. The method according to claim 15, wherein the image sensor unit includes maintenance information.

25. The device according to claim 17, wherein the image sensor unit further includes calibration data includes image sensor unit position and task information with respect to the image sensor unit.

26. The device according to claim 17, wherein the image sensor unit includes maintenance information.

27. A system for generating real-time motion video, comprising:
a video processing device comprising:
a control interface configured to receive control information, control instructions, calibration data and authentication data from a memory and an image sensor controller in an image sensor unit;
a control processing device configured to receive the control information, the control instructions, the calibration data and the authentication data from the control interface;
a media interface configured to receive real-time raw image data from the image sensor of the image sensor unit via a communication cable and a communication protocol;
a media processing device configured to receive from the media interface and to process the real-time raw image data in association with the control processing device,
wherein the processing includes applying a de-mosaicing algorithm to received image data, adjusting received image data based on at least part of the received calibration data and encoding the image data to a predetermined video format, and
wherein the image sensor unit lacks a media processing device for processing the real-time raw image data; and
the video processing device configured to output the processed image data in real time; and
the image sensor unit comprising:
a power interface configured to receive power from the video processing device via a power line;
a control interface configured to transmit the control information, the calibration data, and the authentication data to the control interface of the video processing device;
an analog-to-digital converter configured to digitize the real-time raw image data; and
a media interface configured to transmit the real-time raw image data to the media interface of the video processing device.

28. The method of claim 27, wherein the control processing device is further configured to transmit, via the control interface, timing information for the image sensor, read out mode and power optimization to the image sensor controller.

29. A method for generating real-time motion video, the method comprising:
receiving, at a control interface of a video processing device, calibration data, light source type, and light source power requirement from a memory in an image sensor unit, the calibration data relating to properties of the image sensor unit, wherein the video processing device and the image sensor unit are separate, non-integrated devices,
receiving, at a media interface of the video processing device, real-time raw image data from the image sensor of the image sensor unit via a communication cable and a communication protocol, said real-time raw image data is digitized pixels from the image sensor,
processing, in a media processing device of the video processing device, the real-time raw image data received from the image sensor of the image sensor unit in view of the calibration data, the light source type, and the light source power requirement received at a control processing device from the control interface, wherein the processing includes applying a de-mosaicing algorithm to received image data, adjusting received image data based on at least part of the received calibration data and encoding the image data to a predetermined video format, and
outputting the processed image data in real time.

30. The method of claim 29, wherein the control interface of the video processing device receives authentication data from the memory in the image sensor unit.

* * * * *